(12) United States Patent
Lert et al.

(10) Patent No.: US 9,725,239 B2
(45) Date of Patent: Aug. 8, 2017

(54) STORAGE AND RETRIEVAL SYSTEM

(71) Applicant: Symbotic, LLC, Wilmington, MA (US)

(72) Inventors: John Lert, Wakefield, MA (US); Stephen C. Toebes, Sunderland, MA (US); Robert Sullivan, Wilmington, MA (US)

(73) Assignee: Symbotic, LLC, Wilmington, MA (US)

( * ) Notice: Subject to any disclaimer, the term of this patent is extended or adjusted under 35 U.S.C. 154(b) by 80 days.

(21) Appl. No.: 14/293,556

(22) Filed: Jun. 2, 2014

(65) Prior Publication Data

US 2014/0271063 A1 Sep. 18, 2014

Related U.S. Application Data

(63) Continuation of application No. 12/757,381, filed on Apr. 9, 2010, now Pat. No. 8,740,538.

(60) Provisional application No. 61/168,349, filed on Apr. 10, 2009.

(51) Int. Cl.
| | |
|---|---|
| *B65G 1/04* | (2006.01) |
| *B65G 1/06* | (2006.01) |
| *B65G 1/12* | (2006.01) |
| *B65G 1/137* | (2006.01) |
| *B65G 47/57* | (2006.01) |

(Continued)

(52) U.S. Cl.
CPC ........... *B65G 1/0492* (2013.01); *B65G 1/045* (2013.01); *B65G 1/065* (2013.01); *B65G 1/10* (2013.01); *B65G 1/127* (2013.01); *B65G 1/137* (2013.01); *B65G 1/1371* (2013.01); *B65G 1/1373* (2013.01); *B65G 1/1378* (2013.01); *B65G 47/57* (2013.01); *Y10S 901/01* (2013.01)

(58) Field of Classification Search
CPC .... B65G 1/0492; B65G 1/065; B65G 1/1373; B65G 1/1378
USPC ....................................................... 414/277
See application file for complete search history.

(56) References Cited

U.S. PATENT DOCUMENTS

| | | | |
|---|---|---|---|
| 2,945,604 | A | 7/1960 | Kroll et al. |
| 2,996,621 | A | 8/1961 | Barret, Jr. |

(Continued)

FOREIGN PATENT DOCUMENTS

| | | |
|---|---|---|
| DE | 4104527 | 8/1992 |
| DE | 10142395 | 11/2002 |

(Continued)

*Primary Examiner* — James Keenan
(74) *Attorney, Agent, or Firm* — Perman & Green, LLP

(57) ABSTRACT

A storage and retrieval system including a vertical array of storage levels, each storage level having storage locations, a multilevel vertical conveyor system configured to transport the uncontained case units to and from the vertical array of storage levels, each storage level being configured to receive uncontained case units from the multilevel vertical conveyor system, at least one autonomous transport confined to each storage level, the at least one autonomous transport being configured to transport the uncontained case units between respective storage locations and the multilevel vertical conveyor system, and a controller configured to effect operation of the multilevel vertical conveyor system and at least one autonomous transport for assembling orders of uncontained case units of different types without moving bundles of the same uncontained case unit type throughout the storage and retrieval system.

17 Claims, 9 Drawing Sheets

(51) Int. Cl.
B65G 1/127 (2006.01)
B65G 1/10 (2006.01)

(56) References Cited

U.S. PATENT DOCUMENTS

| | | | |
|---|---|---|---|
| 3,110,131 A * | 11/1963 | Jeffress | E04C 2/044 |
| | | | 405/259.3 |
| 3,161,303 A | 12/1964 | Burrows | |
| 3,175,940 A * | 3/1965 | Talmey | E04C 2/284 |
| | | | 428/215 |
| 3,369,648 A | 2/1968 | Wentz | |
| 3,554,390 A | 1/1971 | Saul | |
| 3,677,421 A | 7/1972 | Kintner | |
| 3,719,408 A * | 3/1973 | Fullington et al. | A47B 71/00 |
| | | | 312/236 |
| 3,737,056 A | 6/1973 | Hathcock, Jr. | |
| 3,802,580 A | 4/1974 | Castaldi | |
| 3,970,840 A | 7/1976 | De Bruine | |
| 4,064,986 A | 12/1977 | Bertovich | |
| 4,273,234 A | 6/1981 | Bourgeois | |
| 4,307,988 A | 12/1981 | Page et al. | |
| 4,395,181 A | 7/1983 | Loomer | |
| 4,406,570 A | 9/1983 | Duncan et al. | |
| 4,428,708 A | 1/1984 | Burt | |
| 4,459,078 A | 7/1984 | Chiantella et al. | |
| 4,492,504 A | 1/1985 | Hainsworth | |
| 4,678,390 A | 7/1987 | Bonneton et al. | |
| 4,679,149 A | 7/1987 | Merz | |
| 4,716,530 A | 12/1987 | Ogawa et al. | |
| 4,786,229 A | 11/1988 | Henderson | |
| 4,811,229 A | 3/1989 | Wilson | |
| 4,936,738 A | 6/1990 | Brennan | |
| 5,002,449 A | 3/1991 | Kita et al. | |
| 5,015,145 A | 5/1991 | Angell et al. | |
| 5,096,355 A | 3/1992 | Schroder | |
| 5,134,353 A | 7/1992 | Kita et al. | |
| 5,134,940 A | 8/1992 | Fujita et al. | |
| 5,135,344 A | 8/1992 | Kita et al. | |
| 5,140,787 A | 8/1992 | Corcoran | |
| 5,179,329 A | 1/1993 | Nishikawa et al. | |
| 5,238,100 A | 8/1993 | Rose et al. | |
| 5,271,703 A | 12/1993 | Lindqvist et al. | |
| 5,273,392 A | 12/1993 | Bernard, II et al. | |
| 5,333,982 A | 8/1994 | Tanizawa et al. | |
| 5,370,492 A | 12/1994 | Gleyze et al. | |
| 5,379,229 A | 1/1995 | Parson et al. | |
| 5,380,139 A | 1/1995 | Pohjonen et al. | |
| 5,388,955 A | 2/1995 | Schroder | |
| 5,403,147 A | 4/1995 | Tanaka | |
| 5,425,612 A | 6/1995 | Ebstein | |
| 5,472,309 A | 12/1995 | Bernard, II et al. | |
| 5,525,884 A | 6/1996 | Sugiura et al. | |
| 5,529,165 A | 6/1996 | Shupert | |
| 5,582,497 A * | 12/1996 | Noguchi | B65G 1/1373 |
| | | | 414/281 |
| 5,601,395 A | 2/1997 | Lichti, Sr. et al. | |
| 5,611,422 A | 3/1997 | Harkonen | |
| 5,615,992 A | 4/1997 | Proske et al. | |
| 5,718,551 A | 2/1998 | Ebstein | |
| 5,764,014 A | 6/1998 | Jakeway et al. | |
| 5,801,506 A | 9/1998 | Netzler | |
| 5,833,431 A | 11/1998 | Rosse, II et al. | |
| 5,839,872 A | 11/1998 | Goto et al. | |
| 5,927,926 A | 7/1999 | Yagi et al. | |
| 5,988,306 A | 11/1999 | Ooishi | |
| 6,036,427 A | 3/2000 | Kita et al. | |
| 6,149,366 A | 11/2000 | Deandrea | |
| 6,158,566 A | 12/2000 | Polloc | |
| 6,272,406 B2 | 8/2001 | Alofs et al. | |
| 6,325,586 B1 | 12/2001 | Loy | |
| 6,341,269 B1 | 1/2002 | Dulaney et al. | |
| 6,345,217 B1 | 2/2002 | Zetler et al. | |
| 6,390,756 B1 | 5/2002 | Isaacs et al. | |
| 6,391,226 B1 | 5/2002 | Chauvette et al. | |
| 6,503,043 B1 | 1/2003 | Smith et al. | |
| 6,652,213 B1 | 11/2003 | Mitchell et al. | |
| 6,721,638 B2 | 4/2004 | Zeitler | |
| 6,748,292 B2 | 6/2004 | Mountz | |
| 6,861,154 B2 | 3/2005 | Olson et al. | |
| 6,864,489 B2 | 3/2005 | Chen et al. | |
| 6,929,440 B1 | 8/2005 | Grond | |
| 6,948,899 B2 | 9/2005 | Lee | |
| 6,950,722 B2 | 9/2005 | Mountz | |
| 7,008,164 B2 | 3/2006 | Rokkaku | |
| 7,025,191 B2 | 4/2006 | Lichti et al. | |
| 7,101,139 B1 | 9/2006 | Benedict | |
| 7,184,855 B2 | 2/2007 | Stingel et al. | |
| 7,266,422 B1 | 9/2007 | DeMotte et al. | |
| 7,329,081 B2 | 2/2008 | Baker et al. | |
| 7,402,018 B2 | 7/2008 | Mountz et al. | |
| 7,495,561 B2 | 2/2009 | Bodin et al. | |
| 7,536,283 B2 | 5/2009 | Potter et al. | |
| 7,591,630 B2 | 9/2009 | Lert, Jr. | |
| 7,671,293 B2 | 3/2010 | Fry et al. | |
| 7,686,560 B2 | 3/2010 | Laurin et al. | |
| 7,751,928 B1 | 7/2010 | Antony et al. | |
| 7,991,505 B2 | 8/2011 | Lert et al. | |
| 8,480,347 B2 | 7/2013 | Schafer | |
| 8,594,835 B2 | 11/2013 | Lert et al. | |
| 2002/0029719 A1 | 3/2002 | Matsukawa | |
| 2002/0076307 A1 | 6/2002 | Fallin et al. | |
| 2003/0033217 A1 | 2/2003 | Cutlip | |
| 2003/0200129 A1 | 10/2003 | Klaubauf et al. | |
| 2004/0065523 A1 | 4/2004 | Lichti et al. | |
| 2004/0093116 A1 | 5/2004 | Mountz | |
| 2004/0238326 A1 | 12/2004 | Lichti | |
| 2006/0104712 A1 | 5/2006 | Bufano et al. | |
| 2006/0257236 A1 | 11/2006 | Stingel, III et al. | |
| 2007/0021864 A1 | 1/2007 | Mountz et al. | |
| 2007/0177011 A1 | 8/2007 | Lewin et al. | |
| 2007/0288123 A1 | 12/2007 | D'andrea et al. | |
| 2007/0290040 A1 | 12/2007 | Wurman et al. | |
| 2007/0293978 A1 | 12/2007 | Wurman et al. | |
| 2008/0001372 A1 | 1/2008 | Hoffman et al. | |
| 2008/0166217 A1 | 7/2008 | Fontana | |
| 2008/0215180 A1 | 9/2008 | Kota | |
| 2008/0269960 A1 * | 10/2008 | Kostmann | B65G 1/0407 |
| | | | 701/2 |
| 2009/0074545 A1 | 3/2009 | Lert et al. | |
| 2009/0114115 A1 | 5/2009 | Minges | |
| 2009/0185884 A1 | 7/2009 | Wurman et al. | |
| 2009/0255213 A1 * | 10/2009 | Schwartau | B29C 63/0034 |
| | | | 52/794.1 |
| 2010/0158648 A1 | 6/2010 | Schafer | |
| 2010/0322746 A1 | 12/2010 | Lert et al. | |

FOREIGN PATENT DOCUMENTS

| | | |
|---|---|---|
| EP | 0282592 | 9/1988 |
| EP | 737630 | 10/1996 |
| EP | 0847943 | 6/1998 |
| EP | 1598291 | 11/2005 |
| EP | 1627830 | 2/2006 |
| EP | 1775240 | 4/2007 |
| FR | 2730715 | 8/1996 |
| JP | 4735387 | 9/1972 |
| JP | 01303211 | 12/1989 |
| JP | 06316309 | 11/1994 |
| JP | 8113321 | 5/1996 |
| JP | 2001344020 | 12/2001 |
| JP | 2002356207 | 12/2002 |
| JP | 2003012117 | 1/2003 |
| JP | 2004131258 | 4/2004 |
| JP | 2008510673 | 4/2008 |
| WO | 9534491 | 12/1995 |
| WO | 2005009324 | 2/2005 |
| WO | 2005056943 | 6/2005 |
| WO | 2006024035 | 2/2006 |
| WO | 2006095047 | 9/2006 |
| WO | 2008125294 | 10/2008 |

* cited by examiner

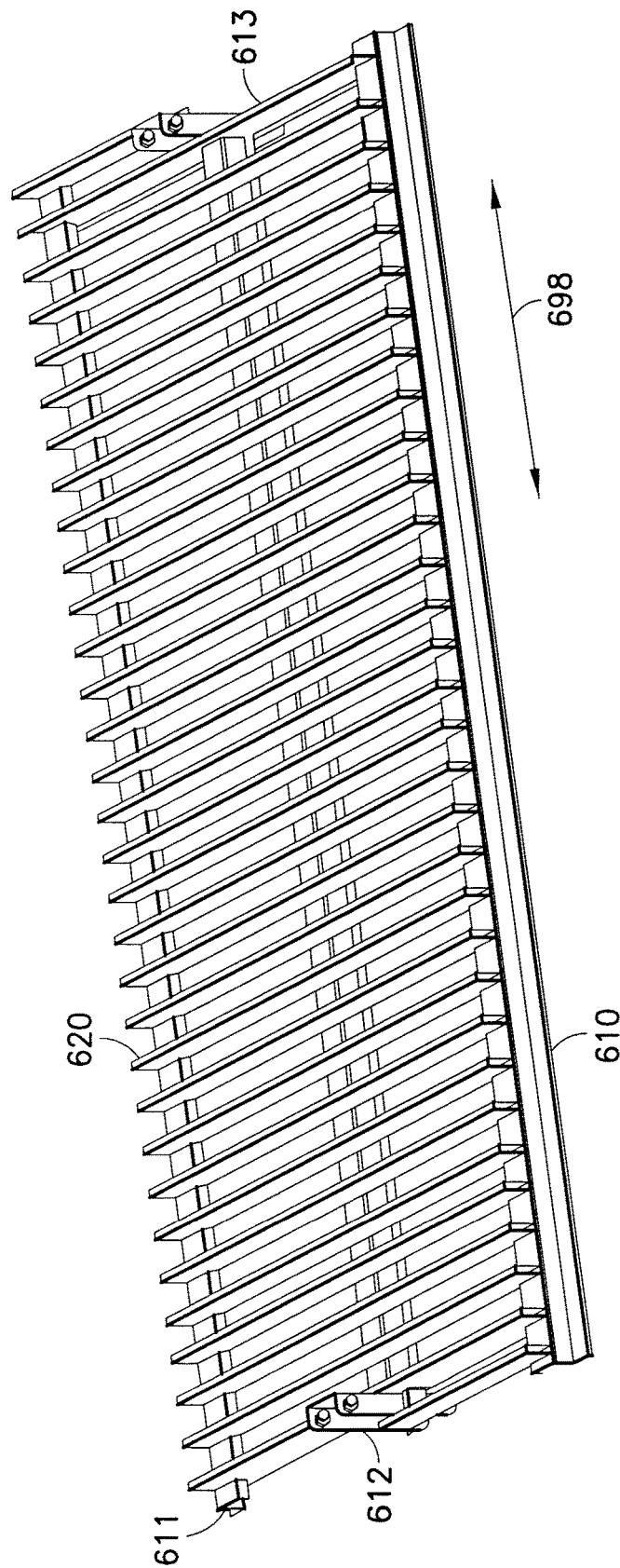

STORAGE AND RETRIEVAL SYSTEM

CROSS REFERENCE TO RELATED APPLICATIONS

This application is a continuation of U.S. Non-Provisional patent application Ser. No. 12/757,381 filed on Apr. 9, 2010 (now U.S. Pat. No. 8,740,538) which claims the benefit of U.S. Provisional Patent Application No. 61/168,349 filed on Apr. 10, 2009, the disclosures of which are incorporated herein by reference in their entireties.

This application is related to U.S. patent application Ser. No. 12/757,337 (now U.S. Pat. No. 8,594,835), entitled "CONTROL SYSTEM FOR STORAGE AND RETRIEVAL SYSTEMS,"; filed on Apr 9, 2010; U.S. patent application Ser. No. 12/757,220 (now U.S. Pat. No. 9,096,375), entitled "STORAGE AND RETRIEVAL SYSTEM,"; filed on Apr. 9, 2010; U.S. patent application Ser. No. 12/757,354, entitled "LIFT INTERFACE FOR STORAGE AND RETRIEVAL SYSTEMS,"; filed on Apr. 9, 2010; and U.S. patent application Ser. No. 12/757,312 (now U.S. Pat. No. 8,425,173), entitled "AUTONOMOUS TRANSPORTS FOR STORAGE AND RETRIEVAL SYSTEMS," filed on Apr. 9, 2010, the disclosures of which are incorporated by reference herein in their entireties.

BACKGROUND

1. Field

The exemplary embodiments generally relate to material handling systems and, more particularly, to automated storage and retrieval systems.

2. Brief Description of Related Developments

Warehouses for storing case units may generally comprise a series of storage racks that are accessible by transport devices such as, for example, fork lifts, carts and elevators that are movable within aisles between or along the storage racks or by other lifting and transporting devices. These transport devices may be automated or manually driven. Generally the items stored on the storage racks are contained in carriers, for example, storage containers such as trays, totes or shipping cases, or on pallets. Generally, incoming pallets to the warehouse (such as from manufacturers) contain shipping containers (e.g. cases) of the same type of goods. Outgoing pallets leaving the warehouse, for example, to retailers have increasingly been made of what may be referred to as mixed pallets. As may be realized, such mixed pallets are made of shipping containers (e.g. totes or cases such as cartons, etc.) containing different types of goods. For example, one case on the mixed pallet may hold grocery products (soup can, soda cans, etc.) and another case on the same pallet may hold cosmetic or household cleaning or electronic products. Indeed some cases may hold different types of products within a single case. Conventional warehousing systems, including conventional automated warehousing systems do not lend themselves to efficient generation of mixed goods pallets. In addition, storing case units in, for example carriers or on pallets generally does not allow for the retrieval of individual case units within those carriers or pallets without transporting the carriers or pallets to a workstation for manual or automated removal of the individual case units.

It would be advantageous to have a storage and retrieval system for efficiently storing and retrieving individual case units without containing those case units in a carrier or on a pallet.

BRIEF DESCRIPTION OF THE DRAWINGS

The foregoing aspects and other features of the disclosed embodiments are explained in the following description, taken in connection with the accompanying drawings, wherein:

FIGS. 6A and 6B illustrate storage shelves in accordance with an exemplary embodiment;

DETAILED DESCRIPTION OF THE EXEMPLARY EMBODIMENT(s)

Figure 1:
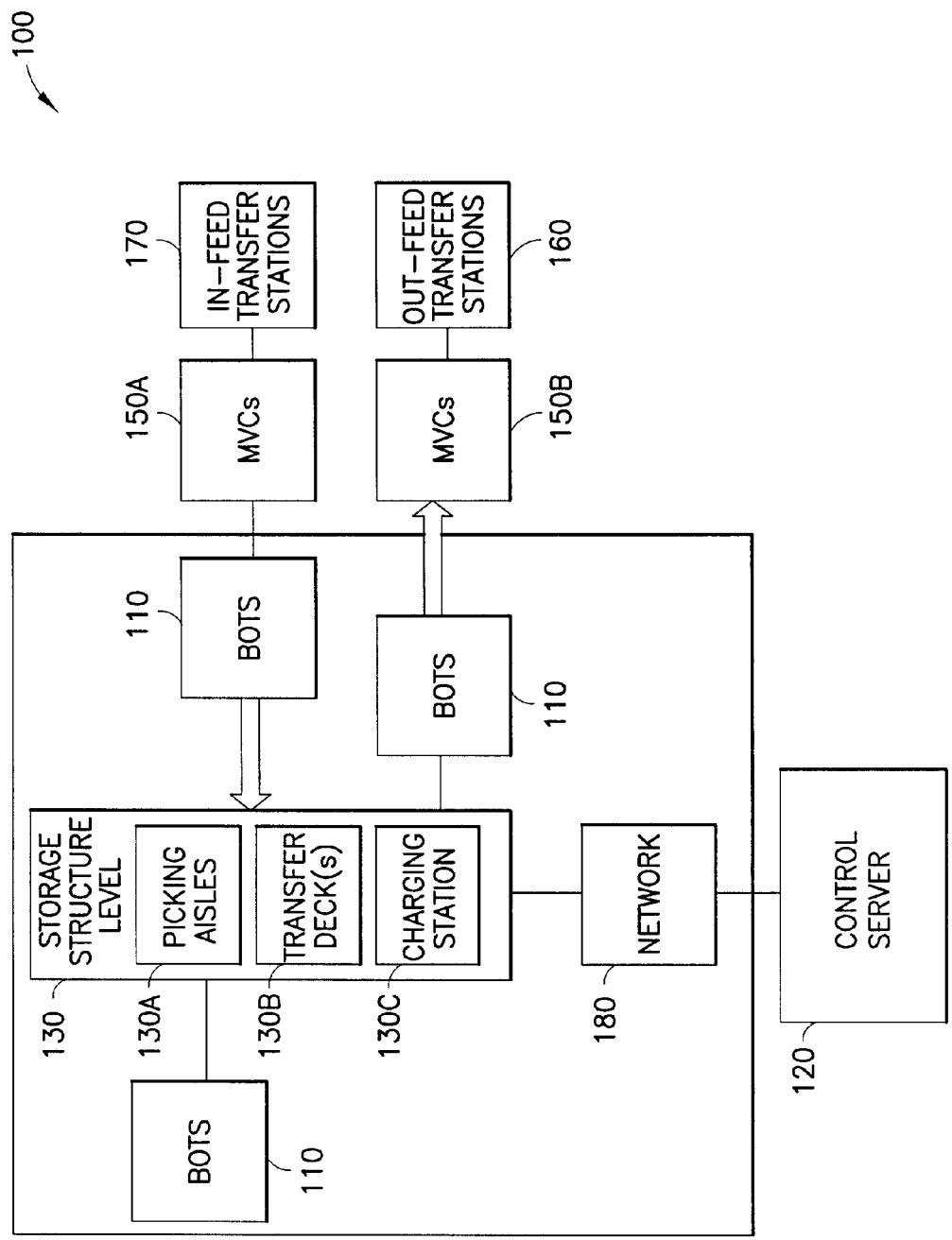
FIG. 1 schematically illustrates an exemplary storage and retrieval system in accordance with an exemplary embodiment.

FIG. 1 generally schematically illustrates a storage and retrieval system 100 in accordance with an exemplary embodiment. Although the embodiments disclosed will be described with reference to the embodiments shown in the drawings, it should be understood that the embodiments disclosed can be embodied in many alternate forms. In addition, any suitable size, shape or type of elements or materials could be used.

In accordance with one exemplary embodiment the storage and retrieval system 100 may operate in a retail distribution center or warehouse to, for example, fulfill orders received from retail stores for case units (where case units as used herein means items not stored in trays, on totes or on pallets, e.g. uncontained). It is noted that the case units may include cases of items (e.g. case of soup cans, boxes of cereal, etc.) or individual items that are adapted to be taken off of or placed on a pallet. In accordance with the exemplary embodiments, shipping cases or case units (e.g. cartons, barrels, boxes, crates, jugs, or any other suitable device for holding case units) may have variable sizes and may be used to hold items in shipping and may be configured so they are capable of being palletized for shipping. It is noted that when, for example, bundles or pallets of case units arrive at the storage and retrieval system the content of each pallet may be uniform (e.g. each pallet holds a predetermined number of the same item—one pallet holds soup and another pallet holds cereal) and as pallets leave the storage and retrieval system the pallets may contain any suitable number and combination of different items (e.g. each pallet may hold different types of items—a pallet holds a combination of soup and cereal). In alternate embodiments the storage and retrieval system described herein may be applied to any environment in which case units are stored and retrieved.

The storage and retrieval system 100 may be configured for installation in, for example, existing warehouse structures or adapted to new warehouse structures. In one exemplary embodiment, the storage and retrieval system may include in-feed and out-feed transfer stations 170, 160, multilevel vertical conveyors 150A, 150B, a storage structure 130, and a number of autonomous vehicular transport robots 110 (referred to herein as "bots"). In alternate embodiments the storage and retrieval system may also include robot or bot transfer stations (as described in, for example, U.S. patent application Ser. No. 12/757,220 (now U.S. Pat. No. 9,096,375), entitled "STORAGE AND RETRIEVAL SYSTEM," previously incorporated by reference herein) that may provide an indirect interface between the bots and the multilevel vertical conveyor 150A, 150B. The in-feed transfer stations 170 and out-feed transfer stations 160 may operate together with their respective multilevel vertical conveyors 150A, 150B for bi-directionally transferring case units to and from one or more levels of the storage structure 130. It is noted that while the multilevel vertical conveyors are described herein as being dedicated inbound conveyors 150A and outbound conveyors 150B, in alternate embodiments each of the conveyors 150A, 150B may be used for both inbound and outbound transfer of case units/items from the storage and retrieval system. The multilevel vertical conveyors may be substantially similar to those described in U.S. patent application Ser. No. 12/757,354, entitled "LIFT INTERFACE FOR STORAGE AND RETRIEVAL SYSTEMS,", and U.S. patent application Ser. No. 12/757,220 (now U.S. Pat. No. 9,096,375), entitled "STORAGE AND RETRIEVAL SYSTEM", previously incorporated by reference herein. For example, the multilevel vertical conveyors may have any suitable number of support shelves for transporting the case units to a predetermined level of the storage and retrieval system. The support shelves may have slatted supports configured to allow fingers of the bots 110 or in-feed/out-feed transfer stations 170, 160 to pass between the slats for transferring case units to and from the conveyor.

As may be realized, the storage and retrieval system 100 may include multiple in-feed and out-feed multilevel vertical conveyors 150A, 150B that are accessible by, for example, bots 110 on each level of the storage and retrieval system 100 so that one or more case unit(s), uncontained or without containment (e.g. case unit(s) are not sealed in trays), can be transferred from a multilevel vertical conveyor 150A, 150B to each storage space on a respective level and from each storage space to any one of the multilevel vertical conveyors 150A, 150B on a respective level. The bots 110 may be configured to transfer the uncontained case units between the storage spaces and the multilevel vertical conveyors with one pick (e.g. substantially directly between the storage spaces and the multilevel vertical conveyors). By way of further example, the designated bot 110 picks the uncontained case unit(s) from a shelf of a multilevel vertical conveyor, transports the uncontained case unit(s) to a predetermined storage area of the storage structure 130 and places the uncontained case unit(s) in the predetermined storage area (and vice versa).

The bots 110 may be configured to place case units, such as the above described retail merchandise, into picking stock in the one or more levels of the storage structure 130 and then selectively retrieve ordered items for shipping the ordered items to, for example, a store or other suitable location. In one exemplary embodiment, the bots 110 may interface directly with the multilevel vertical conveyors 150A, 150B through, for example, extension of a transfer arm or effector of the bot (which may have fingers for interfacing with slatted support shelves of the multi-level vertical conveyors) relative to a frame of the bot. The bots may be substantially similar to those described in U.S. patent application Ser. No. 12/757,312 (now U.S. Pat. No. 8,425,173), entitled "AUTONOMOUS TRANSPORTS FOR STORAGE AND RETRIEVAL SYSTEMS, " previously incorporated by reference herein.

The storage structure 130 may include multiple levels of storage rack modules where each level includes an array of storage spaces (arrayed on the multiple levels and in multiple rows on each level), picking aisles 130A formed between the rows of storage spaces, and transfer decks 130B. In alternate embodiments, each level may also include respective bot transfer stations for providing an indirect interface between the bots and the multilevel vertical conveyors. In this exemplary embodiment, the picking aisles 130A and transfer decks 130B may be arranged for allowing the bots 110 to traverse respective levels of the storage structure 130 for placing case units into picking stock and to retrieve the ordered case units. As may be realized, the storage and retrieval system may be configured to allow random accessibility to the storage spaces. For example, all storage spaces in the storage structure 130 may be treated substantially equally when determining which storage spaces are to be used when picking and placing case units from/to the storage structure 130 such that any storage space of sufficient size can be used to store items. The storage structure 130 of the exemplary embodiments may also be arranged such that there is no vertical or horizontal array partitioning of the storage structure. For example, each multilevel vertical conveyor 150A, 150B is common to all storage spaces (e.g. the array of storage spaces) in the storage structure 130 such that any bot 110 can access each storage space and any multilevel vertical conveyor 150A, 150B can receive case units from any storage space on any level so that the multiple levels in the array of storage spaces substantially act as a single level (e.g. no vertical partitioning). The multilevel vertical conveyors 150A, 150B can also receive case units from any storage space on any level of the storage structure 130 (e.g. no horizontal partitioning).

The storage structure 130 may also include charging stations 130C for replenishing, for example, a battery pack of the bots 110. In one exemplary embodiment, the charging stations 130C may be located at, for example, transfer areas 295 (FIGS. 2-4) of the transfer deck 130B so that the bots 110 can substantially simultaneously transfer items, for example, to and from a multilevel vertical conveyor 150A, 150B while being charged. The bots 110 and other suitable features of the storage and retrieval system 100 may be controlled by, for example, one or more central system control computers (e.g. control server) 120 through, for example, any suitable network 180. The network 180 may be a wired network, a wireless network or a combination of a wireless and wired network using any suitable type and/or number of communication protocols. It is noted that, in one exemplary embodiment, the system control server 120 may be configured to manage and coordinate the overall operation of the storage and retrieval system 100 and interface with, for example, a warehouse management system, which in turn manages the warehouse facility as a whole. The control server 120 may be substantially similar to that described in, for example, U.S. patent application Ser. No. 12/757,337, entitled "CONTROL SYSTEM FOR STORAGE AND RETRIEVAL SYSTEMS," previously incorporated by reference herein.

As an exemplary operation of an order fulfillment process of the storage and retrieval system 100, case units for replenishing the picking stock are input at, for example, depalletizing workstations 210 (FIG. 2) so that items bundled together on pallets (or other suitable container-like transport supports) are separated and individually carried on, for example, conveyors 240 (FIG. 2) or other suitable transfer mechanisms (e.g. manned or automated carts, etc.) to the in-feed transfer stations 170. The in-feed transfer stations 170 assemble the case units into pickfaces (e.g. which include one or more case units) and load the pickfaces onto respective multilevel vertical conveyors 150A, which carry the pickfaces to a predetermined level of the storage structure 130. Bots 110 interface with the multilevel vertical conveyor 150A at, for example, the transfer areas 295 for removing the pickfaces from the multilevel vertical conveyor 150A. The bots transfer the pickfaces from the multilevel vertical conveyor 150A to a predetermined storage module of the storage structure 130.

As may be realized, pickfaces/items of the same type may be stored in different locations within the storage structure so that at least one of that type of pickface/item may be retrieved when other ones of that type of pickface/item are inaccessible. The storage and retrieval system may also be configured to provide multiple access paths or routes to each storage location (e.g. pickface) so that bots may reach each storage location using, for example, a secondary path if a primary path to the storage location is obstructed. It is noted that the control server 120 and one or more sensors on the bots 110 may allow for the assignment and reservation of a pickface for putting away an inbound item such as during replenishment of the storage and retrieval system 100. In one exemplary embodiment, when a storage slot/place becomes available in the storage structure 130, the control server 120 may assign a fictitious item (e.g. an empty case) to the empty storage slot. If there are adjacent empty slots in the storage structure the empty cases of the adjacent storage slots may be combined to fill the empty space on the storage shelf.

Figure 7A:
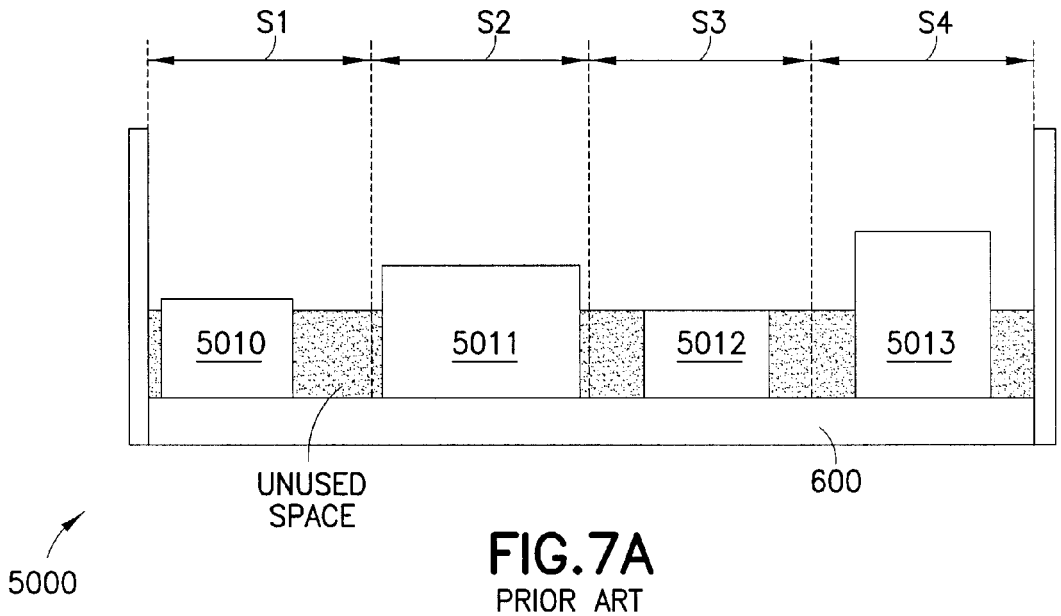
FIG. 7A illustrates a conventional organization of item storage in a storage bay.
Figure 7B:
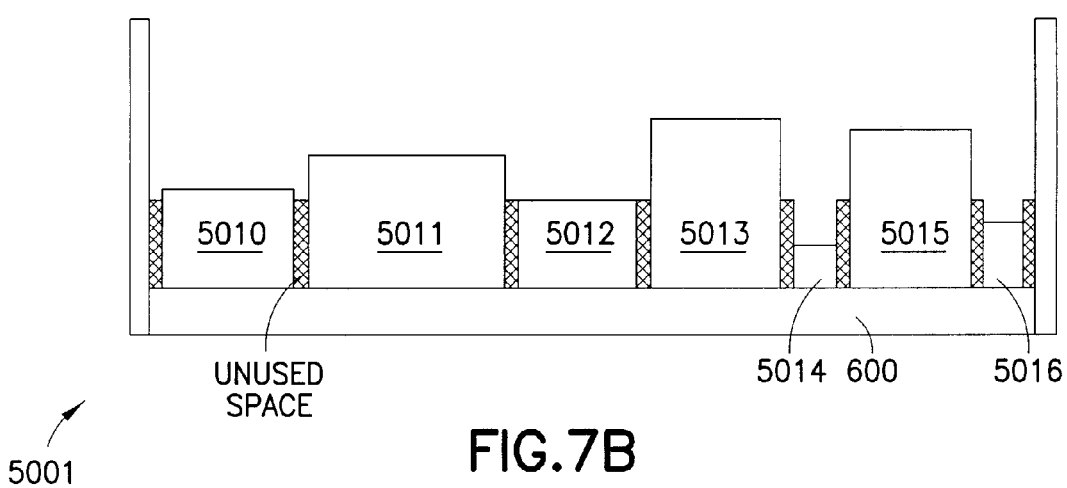
FIG. 7B illustrates an organization of items in a storage bay in accordance with an exemplary embodiment.
Figure 7C:
FIG. 7C illustrates a comparison of unused storage space between the item storage of FIG. 7A and the item storage of FIG. 7B.
Figure 7C:
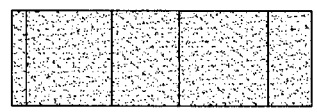

The size of the slots may be variable such as when dynamically allocating shelf space. For example, referring also to FIGS. 7A-7C, instead of placing case units 5011 and 5012 in predetermined storage areas on the storage shelf 5001, the storage slots may be dynamically allocated such that the cases 5011, 5012 are replaced by three cases having the size of case unit 5010. For example, FIG. 7A illustrates a storage bay 5000 divided into storage slots S1-S4 as is done in conventional storage systems. The size of the storage slots S1-S4 may be a fixed size dependent on a size of the largest item (e.g. item 5011) to be stored on the shelf 600 of the storage bay 5000. As can be seen in FIG. 7A, when case units 5010, 5012, 5013 of varying dimensions, which are smaller than case unit 5011, are placed in a respective storage slot S1, S2, S4 a significant portion of the storage bay capacity, as indicated by the shaded boxes, remains unused. In accordance with an exemplary embodiment, FIG. 7B illustrates a storage bay 5001 having dimensions substantially similar to storage bay 5000. In FIG. 7B the case units 5010-5016 are placed on the shelf 600 using dynamic allocation such that the empty storage slots are substantially continuously resized as uncontained case units are placed on the storage shelves (e.g. the storage slots do not have a predetermined size and/or location on the storage shelves). As can be seen in FIG. 7B, dynamically allocating the storage space allows placement of case units 5014-5016 on shelf 600 in addition to case units 5010-5013 (which are the same case units placed in storage bay 5000 described above) such that the unused storage space, as indicated by the hatched boxed, is less than the unused storage space using the fixed sizes slots of FIG. 7A. FIG. 7C illustrates a side by side comparison of the unused storage space for the fixed slots and dynamic allocation storage described above.

It is noted that the unused storage space of bay 5001 using dynamic allocation may be decreased even further by decreasing the amount of space between the case units 5010-5016 which may allow for placement of additional case units on the shelf 600.

As case units are placed within the storage structure the open storage spaces may be analyzed, by for example the control server 120, after each case unit's placement and dynamically re-allocated according to a changed size of the open storage space so that additional case units having a size corresponding to (or less than) a size of the reallocated storage space may be placed in the reallocated storage space. In alternate embodiments, the storage slots may also be allocated so that case units that are frequently picked together are located next to each other. When a predetermined storage space is reserved for a pickface/case unit that is being delivered, at least a portion of the empty case sitting in the location where the case unit is to be placed is replaced by a fictitious case unit having the features (e.g. size, etc.) of the case unit being delivered to prevent other inbound case units from being assigned to the predetermined pickface. If the case unit is smaller than the empty case that it is replacing, the empty case may be resized or replaced with a smaller empty case to fill the unused portion of the storage shelf. Another case unit may then be placed within the storage slot corresponding to the resized smaller empty case and so on.

When an order for individual case units is made the bots 110 retrieve the corresponding pickface from a designated storage module of the storage structure 130 and transfer the ordered case units to a predetermined transfer area 295 located on a level of the storage structure 130 from which the ordered case units were picked. The bot interfaces with multilevel vertical conveyor 150B (e.g. in a manner substantially similar to the transfer of items between the bots 110 and shelves 600 as described herein) at the transfer area 295 for transferring the pickface to the multilevel vertical conveyor 150B. The multilevel vertical conveyor 150B transports the pickface to the out-feed transfer stations 160 where the individual case unit(s) of the pickface are transported to palletizing workstations 220 (FIG. 2) by conveyors 230 (FIG. 2) where the individual case units are placed on outbound pallets (or other suitable container-like transport supports) for shipping to a customer. The out-feed transfer stations 160 and the palletizing workstations 220 may be referred to collectively as an order assembly station. Other examples, of material handling systems in which items are transferred to an outbound container can be found in U.S. patent application Ser. No. 10/928,289 filed on Aug. 28, 2004, and U.S. patent application Ser. No. 12/002,309 filed on Dec. 14, 2007, the disclosures of which are incorporated by reference herein in their entirety. As may be realized, the storage and retrieval system described herein allows for ordering mixed case units of any suitable quantity without having to pick and transport, for example, entire trays, totes or pallets of items to and from the storage structure 130.

Figure 2:
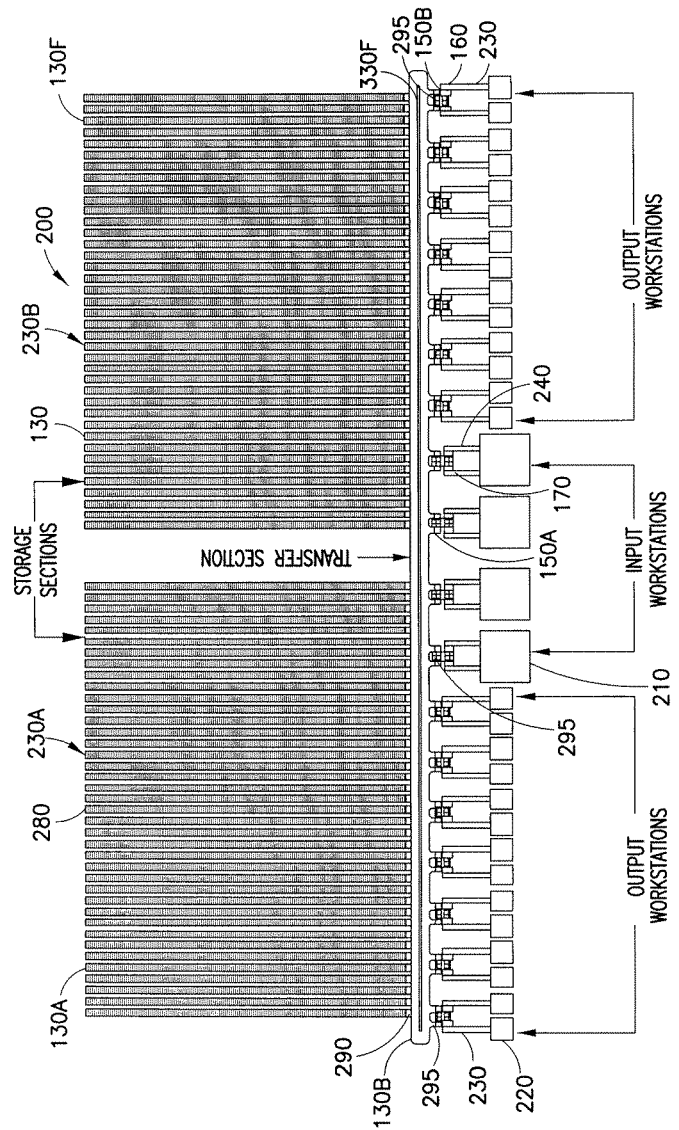
FIG. 2-4 illustrate schematic plan views of storage and retrieval systems having different configurations in accordance with the exemplary embodiments.
Figure 3:
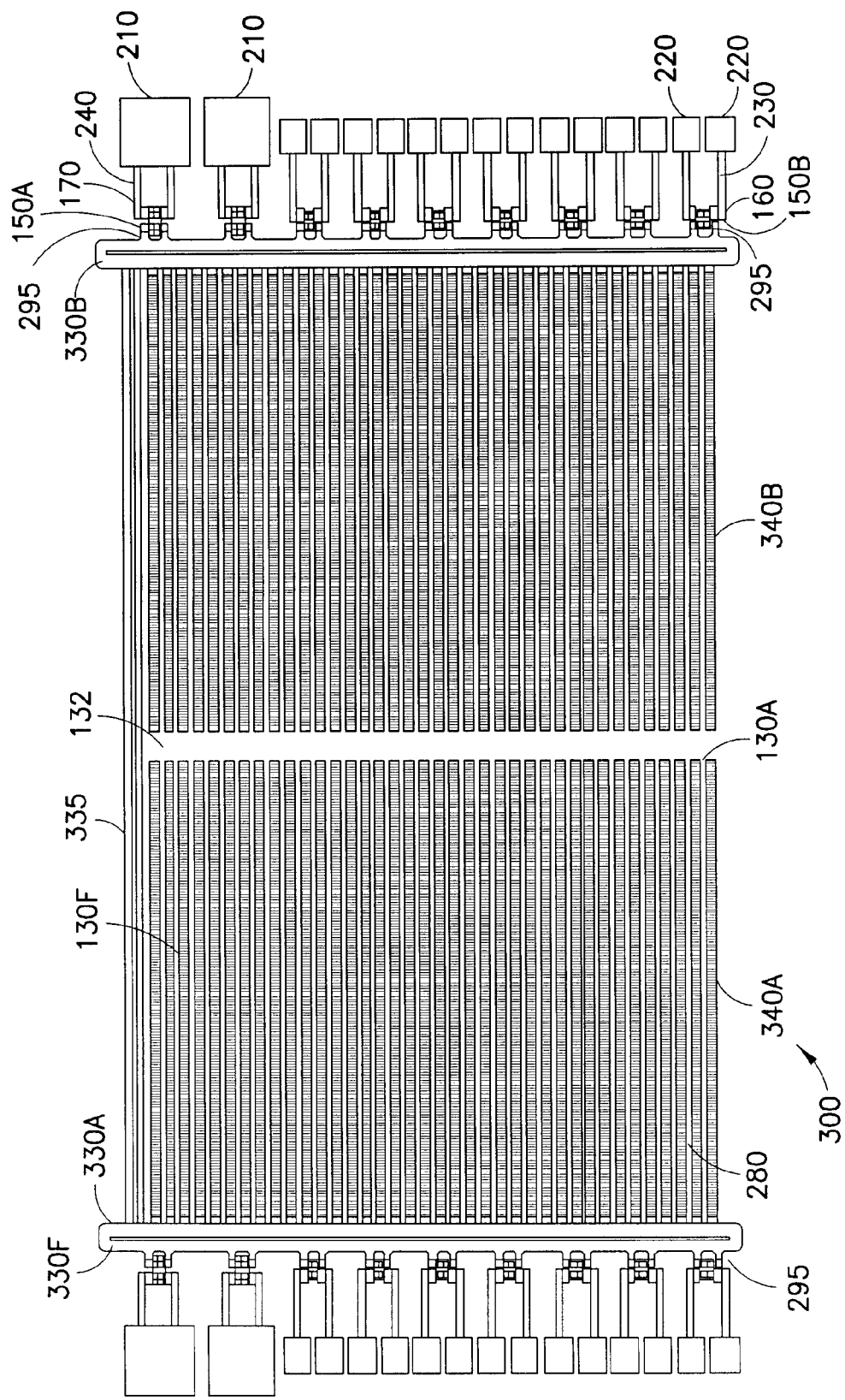
Figure 4:
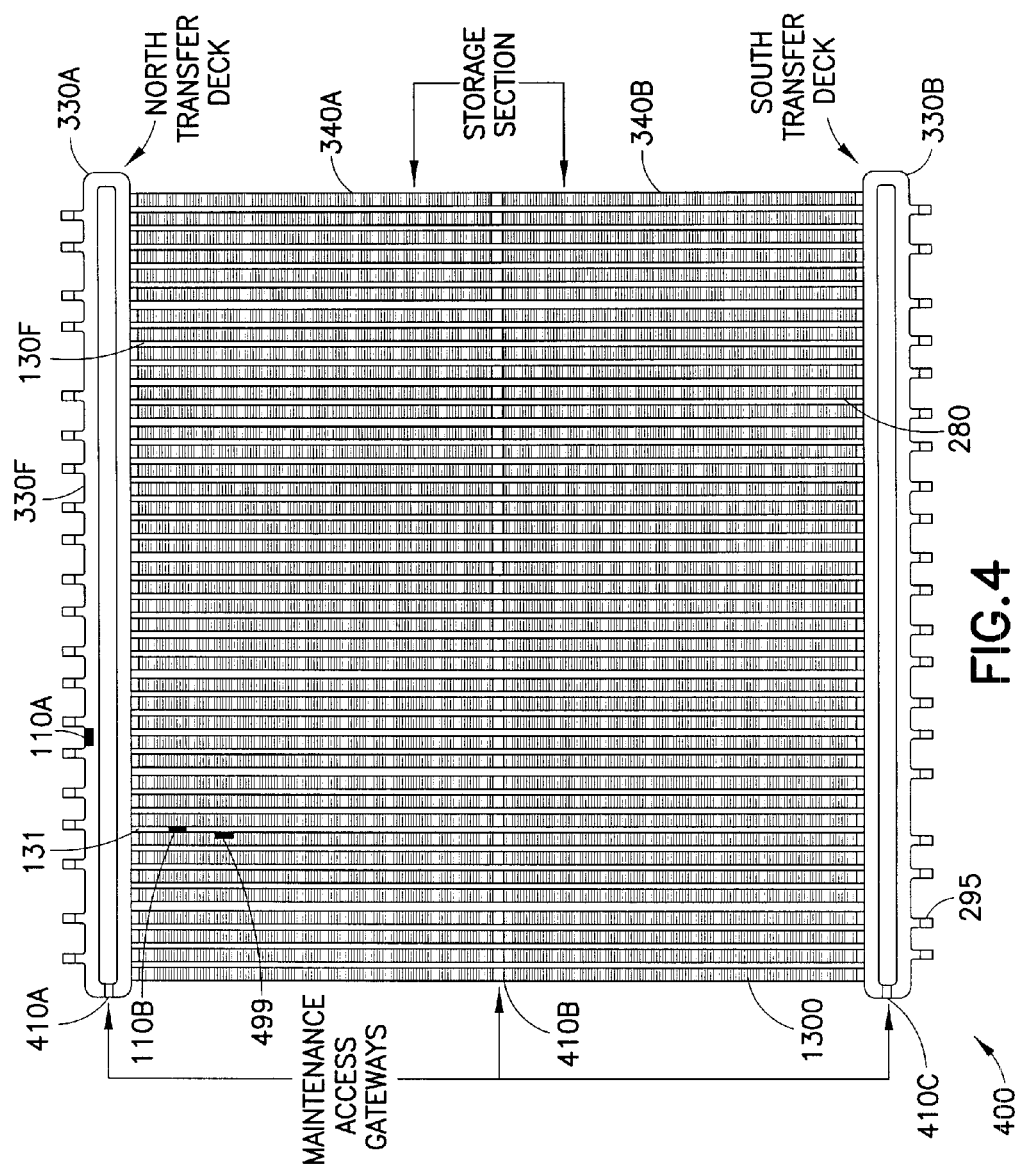

Referring now to FIGS. 2-4, exemplary configurations of the storage and retrieval system 100 are shown. As can be seen in FIG. 2, the storage and retrieval system 200 is configured as a single-ended picking structure in which only one side of the system 200 has a transfer section or deck 130B. The single-ended picking structure may be used in, for example, a building or other structure having loading docks disposed only on one side of the building. As can be seen in FIG. 2, the transfer deck 130B and picking aisles 130A allow bots 110 to traverse an entirety of a level of the storage structure 130 on which that bot 110 is located for transporting items between any suitable storage locations/picking aisles 130A and any suitable multilevel vertical conveyors 150A, 150B. In this exemplary embodiment, the storage and retrieval system 200 includes a first and second storage section 230A, 230B located side by side so that the picking aisles of each section are substantially parallel with each other and facing the same direction (e.g. towards transfer deck 130B).

FIG. 3 illustrates a storage and retrieval system 300 having a double sided picking structure for use in, for example, buildings or other structures having loading docks on two sides of the building. In FIG. 3 the storage and retrieval system 300 includes two storage sections 340A, 340B that are arranged so that the picking aisles 130A in each of the storage sections 340A, 340B are parallel with each other but facing opposing directions such that substantially continuous picking aisles are formed between the opposing transfer decks 330A, 330B. As may be realized, an express travel lane 335 may be located between the opposing transfer decks 330A, 330B for allowing bots 110 to transit between the transfer decks 330A, 330B at greater speeds than those allowed within the picking aisles 130A. As may also be realized the bots 110 on each level of the picking structure of FIG. 3 may traverse the entirety of its respective level such that the bot 110 may serve to transport items throughout the two storage sections 340A, 340B and to and from respective input and output workstations.

FIG. 4 illustrates a storage and retrieval system 400 substantially similar to storage and retrieval system 300. However, the storage and retrieval system 400 illustrates maintenance access gateways 410A, 410B, 410C for allowing, as an example, humans and/or service equipment to enter the storage and retrieval system for performing maintenance and/or repairs to the storage and retrieval system 400. The storage and retrieval systems may also be configured with suitable features for disabling one or more bots 110, conveyors or any other suitable features of the storage and retrieval systems in one or more areas of the storage and retrieval system 100 when maintenance is being performed within the storage and retrieval system 100. In one example, the control server 120 may be configured to disable/enable features of the storage and retrieval system.

The storage and retrieval system, such as those described above with respect to FIGS. 2-4 may be configured to allow substantially unimpeded access to substantially all areas of the storage and retrieval system in the event of, for example, a stoppage in the system so that the system continues operation with substantially no or minimized loss in throughput. A stoppage in the system may include, but is not limited to, a disabled bot 110 within a picking aisle or on a transfer deck, a disabled multilevel vertical conveyor 150A, 150B and/or a disabled in-feed or out-feed transfer station 160, 170. As may be realized, the storage and retrieval system 200, 300, 400 may be configured to allow substantially redundant access to each of the storage locations within the picking aisles. For example, a loss of an input multilevel vertical conveyor 150A may result in substantially no loss of storage space or throughput as there are multiple input multilevel vertical conveyors 150A that can transport case units to each level/storage space within the storage structure 130. As another example, the loss of a bot out of a picking aisle may result in substantially no loss of storage space or throughput as there are multiple bots 110 on each level capable of transferring case units between any one of the storage spaces and any one of the multilevel vertical conveyors 150A, 150B. In still another example, the loss of a bot 110 within a picking aisle may result in substantially no loss of storage space or throughput as only a portion of a picking aisle is blocked and the storage and retrieval system may be configured to provide multiple paths of travel to each of the storage spaces or types of case units within the storage spaces. In yet another example, a loss of an output multilevel vertical conveyor 150B may result in substantially no loss of storage space or throughput as there are multiple output multilevel vertical conveyors 150B that can transport case units from each level/storage space within the storage structure 130. In the exemplary embodiments, transport of the case units (e.g. via the multilevel vertical conveyors and bots) is substantially independent of storage capacity and case unit distribution and vice versa (e.g. the storage capacity and case unit distribution is substantially independent of transport of the case units) such that there is substantially no single point of failure in either storage capacity or throughput of case units through the storage and retrieval system.

The control server 120 may be configured to communicate with the bots 110, multilevel vertical conveyors 150A, 150B, in-feed or out-feed transfer stations 160, 170 and other suitable features/components of the storage and retrieval system in any suitable manner. The bots 110, multilevel vertical conveyors 150A, 150B and transfer stations 160, 170 may each have respective controllers that communicate with the control server 120 for conveying and/or receiving, for example, a respective operational status, location (in the case of the bots 110) or any other suitable information. The control server may record the information sent by the bots 110, multilevel vertical conveyors 150A, 150B and transfer stations 160, 170 for use in, for example, planning order fulfillment or replenishment tasks.

As may be realized, any suitable controller of the storage and retrieval system such as for example, control server 120, may be configured to create any suitable number of alternative pathways for retrieving one or more case units from their respective storage locations when a pathway provided access to those case units is restricted or otherwise blocked. For example, the control server 120 may include suitable programming, memory and other structure for analyzing the information sent by the bots 110, multilevel vertical conveyors 150A, 150B and transfer stations 160, 170 for planning a bot's 110 primary or preferred route to a predetermined item within the storage structure. The preferred route may be the fastest and/or most direct route that the bot 110 can take to retrieve the case units/pickfaces. In alternate embodiments the preferred route may be any suitable route. The control server 120 may also be configured to analyze the information send by the bots 110, multilevel vertical conveyor 150A, 150B and transfer stations 160, 170 for determining if there are any obstructions along the preferred route. If there are obstructions along the preferred route the control server 120 may determine one or more secondary or alternate routes for retrieving the case units so that the obstruction is avoided and the case units can be retrieved without any substantial delay in, for example, fulfilling an order. It should be realized that the bot route planning may also occur on the bot 110 itself by, for example, any suitable control system, such as a control system onboard the bot 110. As an example, the bot control system may be configured to communicate with the control server 120 for accessing the information from other bots 110, the multilevel vertical conveyors 150A, 150B and the transfer stations 160, 170 for determining the preferred and/or alternate routes for accessing an item in a manner substantially similar to that described above. It is noted that the bot control system 1220 may include any suitable programming, memory and/or other structure to effect the determination of the preferred and/or alternate routes.

Referring to FIG. 4, as a non-limiting example, in an order fulfillment process the bot 110A, which is traversing transfer deck 330A, may be instructed to retrieve a case unit 499 from picking aisle 131. However, there may be a disabled bot 110B blocking aisle 131 such that the bot 110A cannot take a preferred (e.g. the most direct and/or fastest) path to the case unit 499. In this example, the control server may instruct the bot 110A to traverse an alternate route such as through any unreserved picking aisle (e.g. an aisle without a bot in it or an aisle that is otherwise unobstructed) so that the bot 110A can travel along, for example, transfer deck 330B. The bot 110A can enter the end of the picking 131 opposite the blockage from transfer deck 330B so as to avoid the disabled bot 110B for accessing the case unit 499. In another exemplary embodiment, as can be seen in FIG. 3, the storage and retrieval system may include one or more bypass aisles 132 that run substantially transverse to the picking aisles to allow the bots 110 to move between picking aisles 130A in lieu of traversing the transfer decks 330A, 330B. The bypass aisles 132 may be substantially similar to travel lanes of the transfer decks 330A, 330B, as described herein, and may allow bidirectional or unidirectional travel of the bots through the bypass aisle. The bypass aisle may provide one or more lanes of bot travel where each lane has a floor and suitable guides for guiding the bot along the bypass aisle in a manner similar to that described herein with respect to the transfer decks 330A, 330B. In alternate embodiments, the bypass aisles may have any suitable configuration for allowing the bots 110 to traverse between the picking aisles 130A. It is noted that whole the bypass aisle 132 is shown with respect to a storage and retrieval system having transfer decks 330A, 330B disposed on opposite ends of the storage structure, in other exemplary embodiments, storage and retrieval system having only one transfer deck, such as shown in FIG. 2, may also include one or more bypass aisles 132. As may also be realized, if one of the in-feed or out-feed transfer stations 160, 170 become disabled order fulfillment or replenishment tasks may be directed, by for example, control server 120, to other ones of the in-feed and out-feed transfer stations 160, 170 without substantial disruption of the storage and retrieval system.

The storage and retrieval systems shown in FIGS. 2-4 have exemplary configurations only and in alternate embodiments the storage and retrieval systems may have any suitable configuration and components for storing and retrieving items as described herein. For example, in alternate embodiments the storage and retrieval system may have any suitable number of storage sections, any suitable number of transfer decks and corresponding input and output workstations. As an example, a storage and retrieval system in accordance with the exemplary embodiments may include transfer decks and corresponding input and output stations located on three or four sides of the storage sections for serving, for example, loading docks disposed on various sides of a building.

Figure 5:
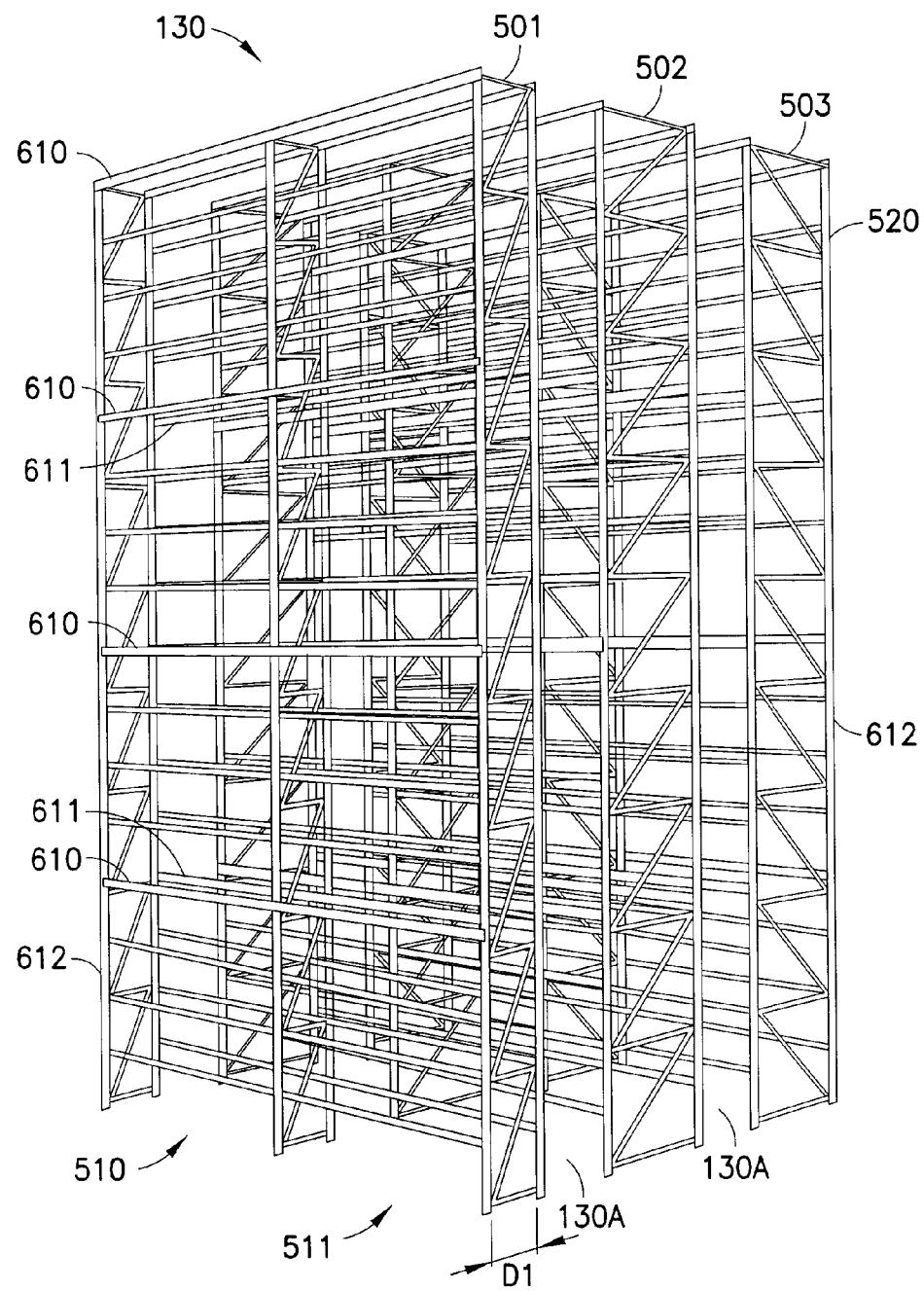
FIG. 5 illustrates a structural portion of a storage and retrieval system in accordance with an exemplary embodiment.
Figure 6B:
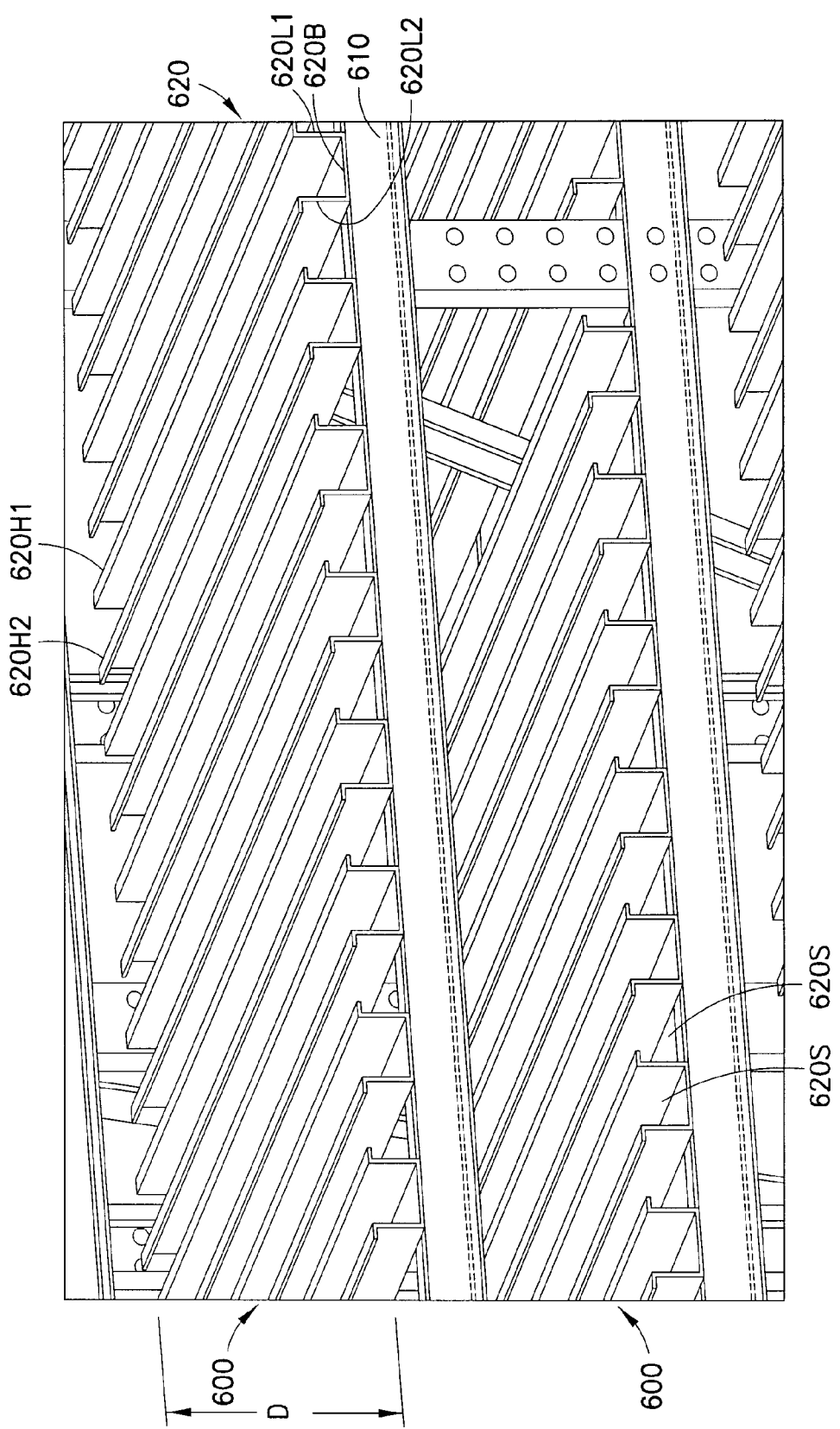

Referring also to FIGS. 5, 6A and 6B, the storage structure 130 will be described in greater detail. In accordance with an exemplary embodiment, the storage structure 130 includes, for example, any suitable number of vertical supports 612 and any suitable number of horizontal supports 610, 611, 613. It is noted that the terms vertical and horizontal are used for exemplary purposes only and that the supports of the storage structure 130 may have any suitable spatial orientation. In this exemplary embodiment, the vertical supports 612 and horizontal supports 610, 611, 613 may form an array of storage modules 501, 502, 503 having storage bays 510, 511. The horizontal supports 610, 611, 613 may be configured to support the storage shelves 600 (described below) as well as the floors 130F for the aisle spaces 130A, which may include tracks for the bots 110. The horizontal supports 610, 611, 613 may be configured to minimize the number of splices between horizontal supports 610, 611, 613 and thus, the number of splices that, for example, tires of the bots 110 will encounter. For exemplary purposes only, the aisle floor 130F may be a solid floor constructed of plymetal panels having, for example, a wood core sandwiched between sheets of sheet metal. In alternate embodiments the floors 130F may have any suitable layered, laminated, solid or other construction and he constructed of any suitable material (s), including, but not limited to plastics, metals, woods and composites. In yet other alternate embodiments the aisle floors 130F may be constructed of a honeycomb structure or other suitable lightweight vet substantially rigid structure. The aisle floors 130F may be coated or treated with wear resistant materials or include replaceable sheets or panels that may be replaced when worn. Tracks 1300 (FIG. 8) for the bots 110 may be incorporated into or otherwise affixed to the aisle floors 130F for guiding the bots 110 in substantially straight lines or paths of travel while the bots 110 are traveling within the storage structure 130. Suitable examples of tracks 1300 are described in U.S. patent application Ser. No. 12/757,312 (now U.S. Pat. No. 8,425,173), entitled "AUTONOMOUS TRANSPORTS FOR STORAGE AND RETRIEVAL SYSTEMS, " previously incorporated by reference. The floors 130F may be attached to, for example, one or more of the vertical and horizontal supports (or any other suitable support structure) in any suitable manner such as with any suitable fasteners including, but not limited to bolts and welds.

Figure 8:
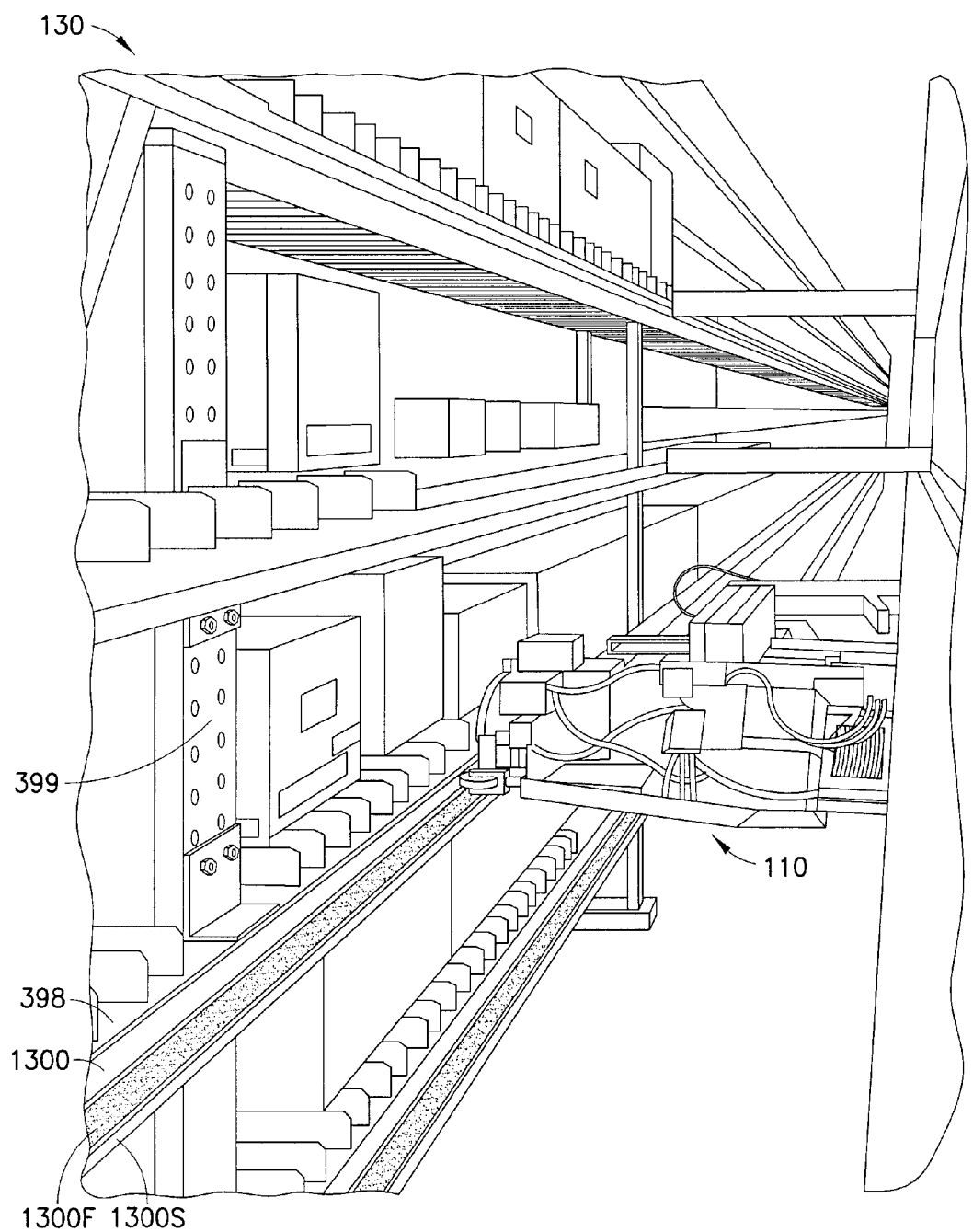
FIG. 8 illustrates a portion of a structural portion of the storage and retrieval system in accordance with an exemplary embodiment.

In one exemplary embodiment, as can be seen in, for example, FIG. 8, the tracks or rails 1300 may be integrally formed with or otherwise fixed to, for example, one or more of the horizontal and vertical supports 398, 399 of the storage rack structure 130 in any suitable manner such that the bot straddles adjacent tracks 1300 for traversing a picking aisle. The tracks 1300 may allow for high-speed travel of the bot 110 without complex steering and navigation control subsystems. The tracks may have any suitable configuration for guiding the bot 110. As can be seen in FIG. 8 fixing the rails 1300 to the supports 398, 399 allows the picking aisles to be substantially floor-less such that bot wheel supports 1300S of the guide rails 1300 extend away from the storage areas a predetermined distance to allow a sufficient surface area for the wheels of the bot 110 to ride along the rails 1300. In alternate embodiments the picking aisles may have any suitable floor that extends between adjacent storage areas on either side of the picking aisle. In one exemplary embodiment, the rails 1300 may include a friction member 1300F for providing traction to the drive wheels of the bot 110. The friction member 1300F may be any suitable member such as for example, a coating, an adhesive backed strip, or any other suitable member that substantially creates a friction surface for interacting with the wheels of the bot 110. The absence of floors on each picking level may allow maintenance personnel to walk down the picking aisles where the height between each storage level would otherwise substantially prevent the maintenance personnel from traversing the picking aisles.

Referring back to FIGS. 5, 6A and 6B, each of the storage bays 510, 511 may hold the picking stock on storage shelves 600 that are separated by aisle spaces 130A. It is noted that in one exemplary embodiment the vertical supports 612 and/or horizontal supports 610, 611, 613 may be configured to allow for adjusting the height or elevation of the storage shelves and/or aisle floors 130F relative to, for example, each other and a floor of the facility in which the storage and retrieval system is located. In alternate embodiments the storage shelves and floors may be fixed in elevation. As can be seen in FIG. 5, storage module 501 is configured as an end module having, for example, about half the width of the other storage modules 502, 503. As an example, the end module 501 may have a wall located on one side and the aisle space 130A located on the opposite side. The depth D1 of end module 501 may be such that access to the storage shelves 600 on module 501 is achieved by the aisle space 130A located on but one side of the storage module 501, whereas the storage shelves 600 of modules 502, 503 may be accessed by storage aisles 130A located on both sides of the modules 502, 503 allowing for, as an example, the storage modules 502, 503 having a depth substantially twice that of the depth D1 of storage module 501.

The storage shelves 600 may include one or more support legs 620L1, 620L2 extending from, for example, the horizontal supports 610, 611, 613. The support legs 620L1, 620L2 may have any suitable configuration and may be part of, for example, a substantially U-shaped channel 620 such that the legs are connected to each other through channel portion 620B. The channel portion 620B may provide an attachment point between the channel 620 and one or more horizontal supports 610, 611, 613. In alternate embodiments, each support leg 620L1, 620L2 may be configured to individually mount to the horizontal supports 610, 611, 613. In this exemplary embodiment, each support leg 620L1, 620L2 includes a bent portion 620H1, 620H2 having a suitable surface area configured to support case units stored on the shelves 600. The bent portions 620H1, 620H2 may be configured to substantially prevent deformation of the case units stored on the shelves. In alternate embodiments the leg portions 620H1, 620H2 may have a suitable thickness or have any other suitable shape and/or configuration for supporting case units stored on the shelves. As can be seen in FIGS. 6A and 6B, the support legs 620L1, 620L2 or channels 620 may form a slatted or corrugated shelf structure where spaces 620S between, for example, the support legs 620L1, 620L2 allow for arms or fingers of the bots 110 to reach into the shelving for transferring case units to and from the shelves. It is noted that the support legs 620L1, 620L2 of the shelves 600 may be configured for storing case units, where adjacent items are spaced any suitable distance from each other. For example, a pitch or spacing between the support legs 620L1, 620L2 in the direction of arrow 698 may be such that the case units are placed on the shelves 600 with a distance of about one pitch between the case units to, for example, minimize contact between case units as the case units are placed and removed from the shelves by the bots 110. For exemplary purposes only, case units located adjacent one another may be spaced apart in, for example, direction 698 a distance of about 2.54 cm. It is also noted that transfer of items to and from the multilevel vertical conveyors 150A, 150B (whether the transfer is made directly or indirectly by the bot 110) may occur in a substantially similar manner to that described above with respect to the storage shelves 600. In alternate embodiments, the spacing between the case units on the shelves may be any suitable spacing. It is also noted that transfer of case units to and from the multilevel vertical conveyors 150A, 150B (whether the transfer is made directly or indirectly by the bot 110) may occur in a substantially similar manner to that described above with respect to storage shelves 600.

Referring again to FIGS. 2-4, at the end of each aisle in the storage structure 130 there may be a transition bay 290 (FIG. 2) that allows the bots 110 to transition onto the transfer decks 130B. As described above, the transfer decks 130 may be located at one or more ends of the aisles 130A. In one example, the transition bay 290 may be configured to allow the bots 110 to transition from travel along a rail(s) within the aisles 130A to travel that is free from being constrained by rails within the transfer decks 130B and to merge with bot traffic on the transfer decks 130B. The transfer decks 130B may include a stacked or vertical array of, for example, substantially looped decks, where each level of the storage structure 130 includes one or more respective transfer decks 130. In alternate embodiments the transfer decks may have any suitable shape and configuration. The transfer decks 130B may be unidirectional decks (i.e. the bots 110 travel in a single predetermined direction around the transfer deck 130B) configured to connect all of the picking aisles 130A on a respective level to corresponding input and output multilevel vertical conveyors 150A, 150B on the respective level. In alternate embodiments, the transfer decks may be bidirectional for allowing the bots to travel in substantially opposite direction around the transfer decks. To allow the bots 110 to access the multilevel vertical conveyors 150A, 150B without obstructing the travel lanes of the transfer decks 130B, each transfer deck 130B may be configured with spurs or transfer areas 295 which may extend from the transfer decks 130B. In one exemplary embodiment the transfer areas 295 may include tracks substantially similar to tracks 1300 (FIG. 4) for guiding the bots 110 to the multilevel vertical conveyors 150A, 150B or in alternate embodiments bot transfer stations. In alternate embodiments, the bots may travel and be guided within the transfer areas 295 in a manner substantially similar to that described herein with respect to the transfer decks.

The travel lanes of the transfer decks 130B may be wider than the travel lanes within the aisles of the storage structure 130. For exemplary purposes only, travel lanes of the transfer decks 130B may be configured to allow the bots 110 to make different types of turns (as described in U.S. patent application Ser. No. 12/757,312 (now U.S. Pat. No. 8,425, 173), entitled "AUTONOMOUS TRANSPORTS FOR STORAGE AND RETRIEVAL SYSTEMS," previously incorporated by reference) when, for example, transitioning onto or off of the transfer decks 130B. The different types of turns may correspond to a desired orientation of the hot 110 within the storage aisles 130A or a lane of the transfer deck 130 on which the bot 110 is travelling. The floor 330F of the transfer decks may have any suitable construction configured to support the bots 110 as they traverse their respective transfer deck(s) 130B. For exemplary purposes only, the transfer deck floors 330F may be substantially similar to the aisle floors 130F described above. In alternate embodiments the transfer deck floors 330F may have any suitable configuration and/or construction. The transfer deck floors 330F may be supported by a lattice of frames and columns that may be connected to, for example, one or more of the vertical supports 612 and horizontal supports 610, 611, 613 in any suitable manner. For example, in one exemplary embodiment the transfer decks may include cantilevered arms that may be driven or otherwise inserted. into corresponding slots, recesses or other openings in one or more of the vertical supports 612 and horizontal supports 610, 611, 613. In alternate embodiments the transfer deck floors 330E may be supported by a structure substantially similar to that described above with respect to FIGS. 5, 6A and 6B. As may be realized, the pitch of the transfer deck floors 330F may be substantially similar to the pitch of the respective aisle floors 130F.

In one exemplary embodiment, the storage structure 130 may include personnel floors 280 (which may include the maintenance access gateways 410A-410C) associated with each level of the storage structure. The personnel floors may be located, for example, within or adjacent to the aisles of the storage structure and/or the transfer decks 130B. In alternate embodiments, the personnel floors 280 may be suitably located to provided reach in access to one side of the transfer decks 130B from within the storage structure where the other opposite side of the transfer decks 130B is accessed through work platforms/scaffolding adjacent the workstations 210, 220 and/or multilevel vertical conveyors. In one exemplary embodiment, the personnel floors 280 may run the full length of each aisle 130A or transfer deck 130B. In alternate embodiments the personnel floors 280 may have any suitable length. The personnel floors 280 may be vertically spaced from each other at predetermined intervals where the space between the personnel floors 280 provides a personnel work zone for resolving problems with, as non-limiting examples, the bots 110, items stored in the storage structure 130 and the storage structure 130 itself. The personnel floors 280 may be configured to provide walking surfaces for, as an example, maintenance technicians or other personnel where the walking zones are distinct from travel lanes of the bots 110. Access to the personnel floors may be provided through the maintenance access gateways 410A-410C or any other suitable access point. Movable barriers or other suitable structures may be provided along the aisles 130A and transfer decks 130B to further separate unintentional interaction between, for example the bots 110 and personnel. In one exemplary embodiment, in normal operation the movable barriers may be in a stowed or retracted position to allow, for example, the bot 110 to pass and access the storage shelves 600. The movable barriers may be placed in an extended position when personnel are located in a predetermined zone or location of the storage structure 130 to block bot 110 access to the aisle(s) or portions of the transfer decks where personnel are located. In one exemplary operation of storage structure maintenance for a predetermined zone of the storage structure 130, all active bots 110 may be removed from the predetermined zone. Bots 110 that require maintenance may be disabled and de-energized within the predetermined zone. The movable barriers may be extended to prevent active bots 110 from entering the predetermined zone and any locks preventing access to the personnel floors may be unlocked or removed. The extension and retraction of the movable barriers, disabling of the bots 110 and removal of bots 110 from the predetermined zone may be controlled in any suitable manner such as by, for example, any suitable control system such as a central controller server 120 and mechanical and/or electromechanical interlocks. It is noted that in alternate embodiments, the storage and retrieval system may include any suitable personnel access not limited to that described above.

The structure, such as structure 130, of the storage and retrieval systems described herein may be configured to sustain predetermined loads placed on the structure by normal service and events such as, for exemplary purposes only, earthquakes as defined by local and federal codes. As an example, these loads may include the dead weight of the structure, inventory stored in and transferred throughout the structure, the bots 110, seismic loads, thermal expansion and sufficient stiffness for bot control and positioning. The structure of the storage and retrieval systems 100 may also be configured for ease of assembly, maintenance access, modularity and efficient and economical material use. Non-limiting examples, of the codes to which the structure may be configured to comply include ASCE7, AISC Manual of Steel Construction, AISC Code of Standard Practice for Steel Buildings and Bridges, RMI (Rack Manufacturers Institute) and Materials Handling Industry of America. The structural components (e.g. vertical/horizontal supports, floors, etc.) of the storage and retrieval systems described herein may also include wear and/or corrosion resistant coatings including surface treatments such as, for example, paints and galvanization. In one example, the coating may include a base coating and a contrasting top coating such that any wearing of the top coating will be readily visible. In alternate embodiments the coatings and surface treatments may have any suitable configurations and colors so that wear is easily identifiable.

The storage structure 130 may be configured to be rapidly assembled and installed in the field in a "bottom up construction"(e.g. each level is constructed sequentially such that lower levels in the sequence are substantially completed before the upper levels in the sequence). For example, the vertical supports 612 and/or horizontal supports 610, 611, 613 (and/or any other components of the storage structure 130) may be predrilled, punched or otherwise preformed with assembly holes. Base plates for supporting each of the vertical supports 612 and for securing the vertical supports 612 to a floor may be preinstalled on the respective vertical supports 612. Templates may be provided for locating anchor bolts in the floor for securing the base plates. The vertical supports 612 may be configured with brackets for receiving and at least partially securing the horizontal supports 610, 611, 613. Preformed holes in the horizontal supports may also be used to, for example, bolt or otherwise fasten the horizontal supports to the vertical supports. The shelves 600 may be field assembled from prefinished components and affixed to, for example, the horizontal supports 610, 611, 613 in any suitable manner. Separate braces such as ties may be also provided for securing the horizontal supports 610, 611, 613. The transfer decks 130B may be installed in a manner substantially similar to that described above. The floors and decking of the storage structure 130 may be affixed to the horizontal supports in any suitable manner, such as for example through fasteners. The floors and decking may be preformed with installation holes to allow for securing the floors and decking to the horizontal supports. The tracking 1300 (FIG. 4) for the bots 110 may be preinstalled on or within the aisle flooring or installed in the field using for example, preformed holes or other installation guides such as templates. It is noted that in alternate embodiments, the storage structure 130 may be constructed and assembled in any suitable manner.

It should be understood that the exemplary embodiments described herein may be used individually or in any suitable combination thereof. It should also be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. An automated case unit storage system for handling uncontained case units that are adapted for being palletized for shipping to or from a storage facility, the automated case unit storage system comprising:
- an array of multilevel storage rack modules having storage areas separated by picking aisles;
- multiple levels of stacked tiers, each tier providing access to one level of the array of multilevel storage rack modules and including at least one transfer deck and the picking aisles, where the at least one transfer deck connects each picking aisle to other picking aisles on a respective tier;
- at least one input conveyor connected to at least one of the multiple levels of stacked tiers, the at least one input conveyor being configured so as to engage the uncontained case units input into the array of multilevel storage rack modules;
- at least one output conveyor connected to at least one of the multiple levels of stacked tiers, each of the at least one output conveyor being configured so as to engage the uncontained case units output from the array of multilevel storage rack modules; and
- at least one autonomous transport vehicle located on the at least one of the multiple levels of stacked tiers, the at least one autonomous transport vehicle being configured to traverse, with at least one uncontained case unit held thereon, at least one transfer deck and picking aisles of the at least one of the multiple levels of stacked tiers to transport the at least one uncontained case unit between a predetermined storage rack module and one of the input and output conveyors, where the at least one autonomous transport vehicle is capable of accessing each storage area.

2. The automated case unit storage system of claim 1, wherein each of the at least one transfer deck comprises at least one travel loop arranged substantially perpendicular to the picking aisles, the travel loop providing access to each of the picking aisles, the at least one input conveyor and the at least one output conveyor for a respective level of the stacked tiers.

3. The automated case unit storage system of claim 2, wherein the at least one transfer deck is disposed on one end of the picking aisles for forming a single sided picking structure.

4. The automated case unit storage system of claim 2, wherein the at least one transfer deck comprises two transfer decks disposed at opposite ends of the picking aisles for forming a two sided picking structure.

5. The automated case unit storage system of claim 1, wherein at least one of the multiple levels of stacked tiers and picking aisles comprises at least one layered panel having first and second surface layers and a core layer disposed between the first and second surface layers, the first and second surface layers having a greater stiffness than the core layer.

6. The automated case unit storage system of claim 1, wherein the at least one input conveyor and the at least one output conveyor comprise at least one substantially continuous lift, system, the at least one substantially continuous lift system effecting ingress and egress of case units to and from the array of multilevel storage rack modules.

7. The automated case unit storage system of claim 1, wherein at least one of the picking aisles is configured to physically constrain movement of at least one autonomous transport vehicle during travel within the picking aisle and the at least one transfer deck being configured to allow unconstrained guided movement of the at least one autonomous transport vehicle.

8. The automated case unit storage system of claim 1, wherein the at least one transfer deck comprises at least a first travel lane and a second travel lane configured to allow the at least one autonomous transport vehicle access to the picking aisles.

9. The automated case unit storage system of claim 1, wherein the at least one picking aisle and the at least one transfer deck allow the at least one autonomous transport vehicle unrestricted access to at least the array of multilevel storage rack modules, at least one input station and at least one output station on a respective level.

10. The automated case unit storage system of claim 1, wherein at least one storage rack module in the array of multilevel storage rack modules comprises at least corrugated shelving.

11. A method for automatically handling uncontained case units that are adapted for being palletized for shipping to or from a storage facility, the method comprising:
- providing an array of multilevel storage rack modules having storage areas separated by picking aisles;
- providing multiple levels of stacked tiers, at least one tier providing access to one level of the array of multilevel storage rack modules and including at least one transfer deck and the picking aisles, where the at least one transfer deck connects each picking aisle to other picking aisles on a respective tier;
- inputting the uncontained case units into the array of multilevel storage rack modules with at least one input conveyor commonly connected to at least one of the multiple levels of stacked tiers where the at least one input conveyor engage uncontained case unit input into the array of multilevel storage rack modules;
- outputting the uncontained case units from the array of multilevel storage rack modules with at least one output conveyor commonly connected to at least one of the multiple levels of stacked tiers where the at one output conveyor engages the uncontained case unit input into the array of multilevel storage rack modules; and
- transporting at least one uncontained case unit between a predetermined storage rack module and one of the input and output conveyors with at least one autonomous transport vehicle confined to the respective level, the at least one autonomous transport vehicle being configured to traverse, with the at least one uncontained case unit held thereon, the at least one transfer deck and the picking aisles for transporting the at least one uncontained case unit.

12. The method of claim 11, further comprising providing access, with the at least one transfer deck, to each of the picking aisles, the at least one input conveyor and the at least one output conveyor for a respective level of the stacked tiers, where the at least one transfer deck forms at least one travel loop arranged substantially perpendicular to the picking aisles.

13. The method of claim 12, further comprising forming a single sided picking structure by disposing the at least one transfer deck on one end of the picking aisles.

14. The method of claim 12, wherein the at least one transfer deck includes two transfer decks, the method further comprising forming a two sided picking structure by disposing the two transfer decks at opposite ends of the picking aisles.

15. The method of claim 11, further comprising effecting ingress and egress of case units to and from the array of multilevel storage rack modules with at least one substantially continuous lift system formed by the at least one input conveyor and the at least one output conveyor.

16. The method of claim 11, further comprising physically constraining movement of the at least one autonomous transport vehicle during travel within the picking aisles and allowing unconstrained guided movement of the at least one autonomous transport vehicle during travel along the at least one transfer deck.

17. The method of claim 11, further comprising allowing the at least one autonomous transport vehicle unrestricted access, with the at least one picking aisle and the at least one transfer deck, to at least the array of multilevel storage rack modules, at least one input station and at least one output station on a respective level.

\* \* \* \* \*